(12) United States Patent
Limpaecher et al.

(10) Patent No.: US 8,775,518 B2
(45) Date of Patent: Jul. 8, 2014

(54) CLOUD-CONNECTED, INTERACTIVE APPLICATION SHARED THROUGH A SOCIAL NETWORK

(75) Inventors: Alex Limpaecher, Redmond, WA (US); Michael Cohen, Redmond, WA (US); C. Larry Zitnick, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 13/549,535

(22) Filed: Jul. 16, 2012

(65) Prior Publication Data

US 2014/0019538 A1  Jan. 16, 2014

(51) Int. Cl.
*G06F 15/16* (2006.01)

(52) U.S. Cl.
USPC ........... 709/204; 705/319; 705/27.1; 707/769

(58) Field of Classification Search
CPC .......... H04L 67/12; H04L 67/22; H04L 67/36
USPC ................... 709/204; 705/319, 27.1; 715/769
See application file for complete search history.

(56) References Cited

U.S. PATENT DOCUMENTS

| | | | |
|---|---|---|---|
| 7,231,032 B2 * | 6/2007 | Nevman et al. | 379/220.01 |
| 7,234,117 B2 | 6/2007 | Zaner et al. | |
| 7,373,590 B2 | 5/2008 | Woolf et al. | |
| 7,707,251 B2 | 4/2010 | Birch | |
| 7,778,487 B2 | 8/2010 | Cohen et al. | |
| 8,209,608 B1 * | 6/2012 | Linyard et al. | 715/716 |
| 2008/0098005 A1 | 4/2008 | Goradia | |
| 2010/0070878 A1 | 3/2010 | Amento et al. | |
| 2010/0306249 A1 * | 12/2010 | Hill et al. | 707/769 |
| 2011/0078590 A1 | 3/2011 | Hao et al. | |
| 2011/0137991 A1 * | 6/2011 | Russell | 709/204 |
| 2011/0161202 A1 * | 6/2011 | Arunachalan | 705/27.1 |
| 2012/0131350 A1 * | 5/2012 | Atherton | 713/186 |
| 2012/0303439 A1 * | 11/2012 | Flitcroft et al. | 705/14.36 |
| 2013/0073473 A1 * | 3/2013 | Heath | 705/319 |
| 2013/0095864 A1 * | 4/2013 | Marovets | 455/466 |
| 2013/0268357 A1 * | 10/2013 | Heath | 705/14.53 |

OTHER PUBLICATIONS

"ScreenDASh Capture, edit, and share images in second: Features", Retrieved at <<http://screendash.com/features>>, Retrieved Date: Oct. 21, 2011, pp. 2.

* cited by examiner

*Primary Examiner* — Tesfay Yohannes
(74) *Attorney, Agent, or Firm* — Steve Wight; Carole Boelitz; Micky Minhas

(57) ABSTRACT

The current patent application is directed to a class of highly functional, cloud-connected, interactive applications that are well suited for distribution and execution in social-networking contexts. When executed within the contexts of browser applications running on processor-controlled electronic devices, the class of application programs to which the current patent application is directed provides for importing images and other information from a social-networking service, developing digitally encoded and electronically stored content based on the imported images and other information, and distributing the digitally encoded and electronically stored content within a social-networking environment.

17 Claims, 22 Drawing Sheets

Pencil

CLOUD-CONNECTED, INTERACTIVE APPLICATION SHARED THROUGH A SOCIAL NETWORK

TECHNICAL FIELD

The current patent application is directed to interactive-application-controlled computer systems and social networking and, in particular, to a cloud-connected, interactive application shared through a social-networking service.

BACKGROUND

During the past 50 years, computing and communications technologies have rapidly advanced in functionality, capacity, and availability. While computing was once available only to large corporations and governmental organizations that could afford extremely expensive room-sized computer installations, computing resources are now distributed throughout the world and densely interconnected by many different high-bandwidth communications media, including Internet-based communications provided over local and wide-area networks, public telephone systems, wireless communications, and by other communications technologies. Highly available and economical computing resources and dense interconnection through modern communications technologies have spawned new industries and form the basis of new electronic infrastructures, including e-commerce infrastructures, social-networking services, and utility-like cloud-computing services. The economical availability of high-bandwidth computational resources and communications technologies have also created large markets for many different types of application programs that can be distributed through communications media to a variety of different types of computing devices distributed throughout the world, including the social-networking-services market. There remain, however, a variety of constraints and hurdles to developing highly functional, cloud-connected interactive applications for widespread distribution and use in social-networking contexts. The current patent application is directed to a class of highly functional, cloud-connected, interactive applications suited for distribution and use in social-networking contexts.

SUMMARY

The current patent application is directed to a class of highly functional, cloud-connected, interactive applications that are well suited for distribution and execution in social-networking contexts. When executed within the contexts of browser applications running on processor-controlled electronic devices, the class of application programs to which the current patent application is directed provides for importing images and other information from a social-networking service, developing digitally encoded and electronically stored content based on the imported images and other information, and distributing the digitally encoded and electronically stored content within a social-networking environment. Neither this section nor the sections which follow are intended to either limit the scope of the claims which follow or define the scope of those claims.

DETAILED DESCRIPTION

The current patent application is directed to a class of highly functional, cloud-connected, interactive computer applications for distribution and use in social-networking contexts. The current patent application discloses, as an example, a drawing application that is distributed and used within a social-networking context, but the methods and technologies embodied within the disclosed drawing application may be employed in other highly functional, cloud-connected interactive applications developed for distribution and use in social-networking contexts. These applications are highly functional because they employ a rich set of user-interface tools, communications technologies, data-manipulation and data-storage interfaces, and other tools and functionalities provided by D&R systems discussed below. These applications are cloud-connected because the use cloud-computing services provided by cloud-computing facilities. These applications are interactive because they provide user interfaces that allow for real-time input by, and interactions with, a human user.

Figure 1:
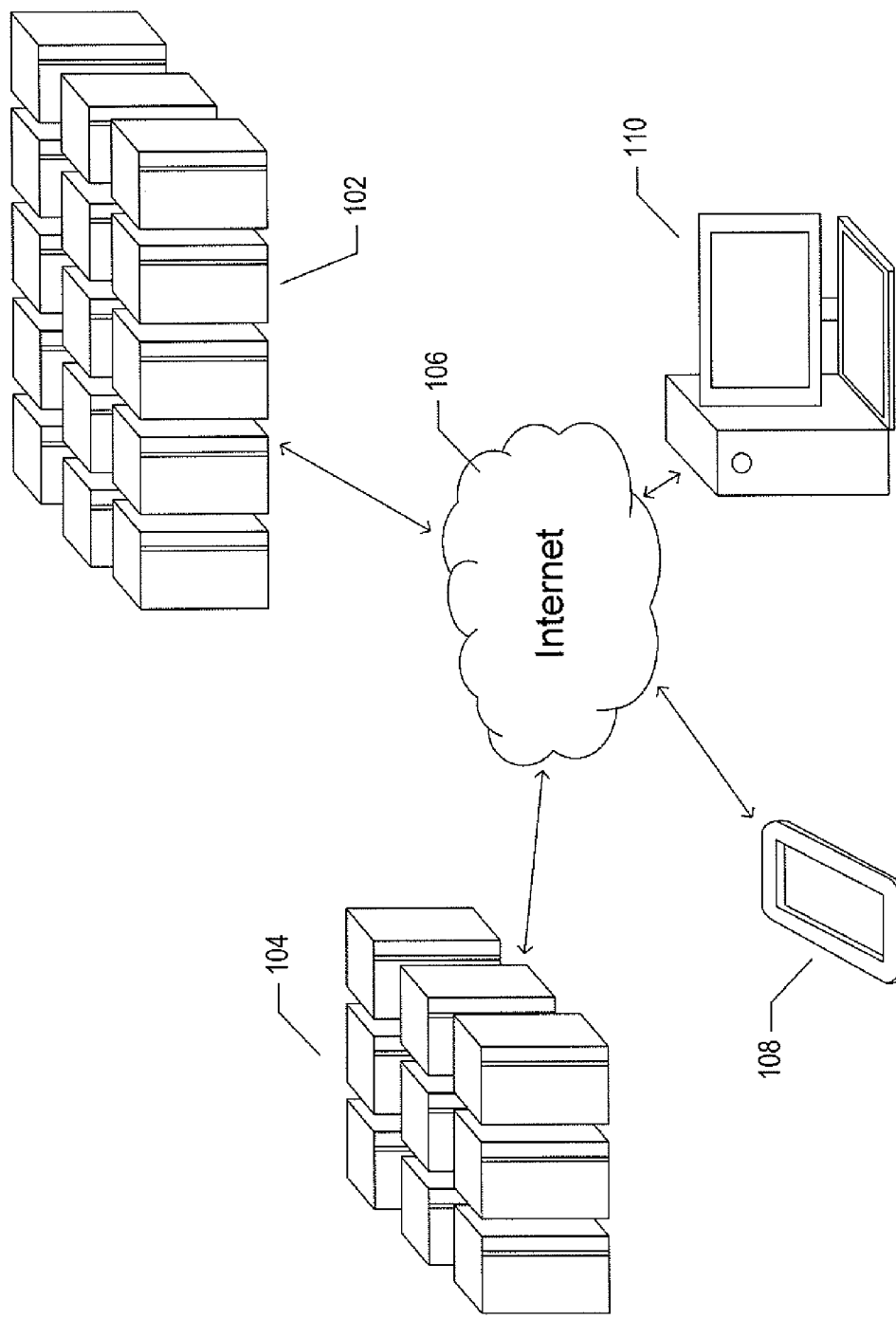
FIG. 1 illustrates computational entities that together comprise a computing environment in which the highly functional, cloud-connected interactive applications to which the current patent application is directed are executed.

FIG. 1 illustrates computational entities that together comprise a computing environment in which the highly functional, cloud-connected interactive applications to which the current patent application is directed are executed. These entities include a cloud-computing facility 102, a social-networking facility 104, various types of communications media, routers and other hardware, and control functionality and protocols that together comprise the Internet 106, and a variety of different types of user computing devices, including, in FIG. 1, a tablet computer 108 and a personal computer ("PC") 110. The highly functional, cloud-connected interactive applications, to which the current patent application is directed, execute within user devices (108 and 110), store and retrieve data from a cloud-computing facility 102 via the Internet, and interface to, and execute within, an electronic community of users that are interconnected and provided social-networking services by the social-networking facility 104.

It should be noted, at the onset, that the highly functional, cloud-connected, interactive application programs necessarily execute on physical computer devices controlled by the highly functional, cloud-connected, interactive application programs to carry out a variety of physical, real-world operations and tasks, including presenting a visual user interface on an electronic display device to a user, transmitting and receiving electronic data through the Internet, storing and retrieving electronically encoded data to and from physical mass-storage devices within the cloud-computing facility, and electronically interacting with various social-networking interfaces provided by the social-networking facility. Those with even cursory understanding of modern technology and computer science well understand that when electronic computing devices are controlled by application programs, they become specialized electronic devices with specialized functionalities provided and controlled by application programs. Application programs are no less a real and physical component of such specialized electronic devices than memories, processors, mass-storage devices, busses, power supplies, and other components of the specialized electronic devices.

Figure 2:
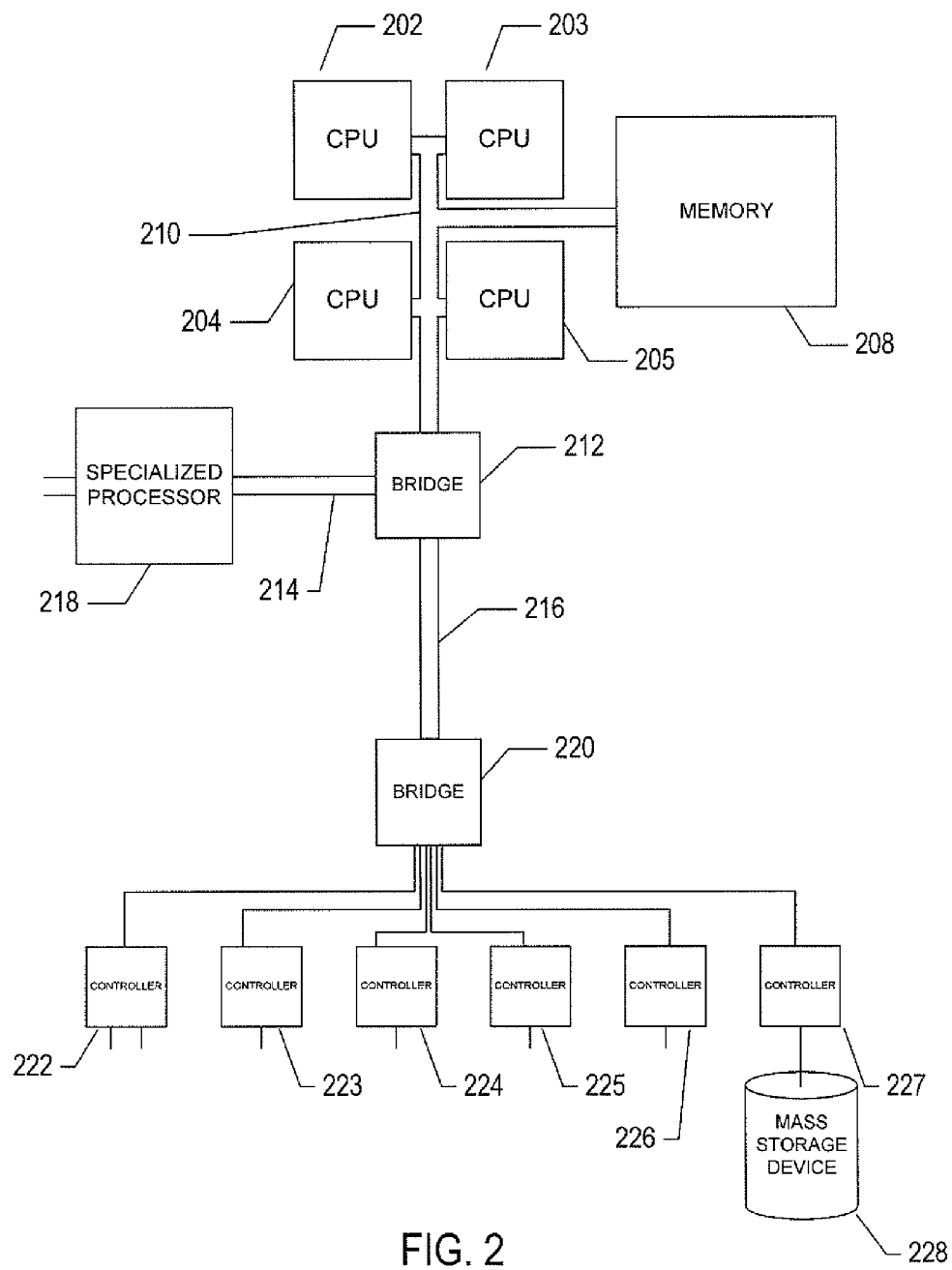
FIG. 2 illustrates a general-purpose computer system.

FIG. 2 illustrates a general-purpose computer system. The computer system contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. These busses or serial interconnections, in turn, connect the CPUs and memory with specialized processors, such as a graphics processor 218, and with one or more additional bridges 220, which are interconnected with high-speed serial links or with multiple controllers 222-227, such as controller 227, that provide access to various different types of mass-storage devices 228, electronic displays, input devices, and other such components, subcomponents, and computational resources. The highly functional, cloud-connected, interactive computer applications to which the current patent application is directed may be implemented to execute on many different types of computational platforms that can be generally represented by the general-purpose computer-system architecture shown in FIG. 2. Similarly, many cloud-computing-facility computer systems and social-networking-service computer systems may also be generally represented by the general-purpose computer-system architecture shown in FIG. 2.

Figure 3:
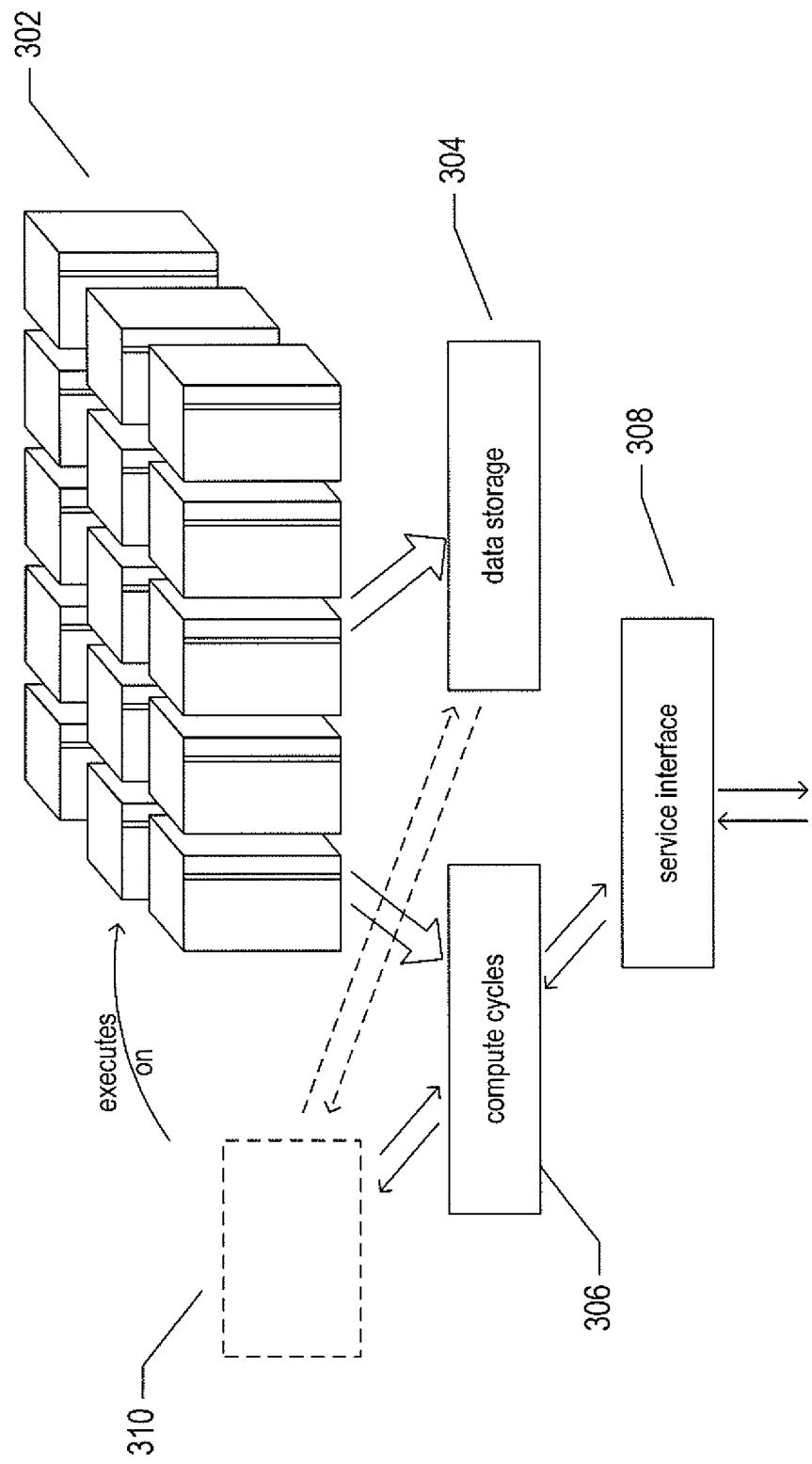
FIG. 3 illustrates a first cloud-computing data-storage method used by highly functional, cloud-connected interactive applications to which the current patent application is directed.

FIG. 3 illustrates a first cloud-computing data-storage method used by highly functional, cloud-connected interactive applications to which the current patent application is directed. In general, cloud-computing facilities 302 offer two basic services to remote clients through the Internet and other communications media: (1) a data-storage service and corresponding interface 304; and (2) a remote-computing service and interface 306. Cloud-computing facilities, for example, allow remote users to download and execute application programs on cloud-computing-facility computer systems. Although various different types of cloud-computing facilities provide data-storage and remote-computing services in different ways, a cloud-computing facility generally associates client applications with configuration files, instantiates virtual machines on cloud-computing computers to run instances of the application program, and provide communication ports and facilities to allow client application programs to communicate with external, remote computers and among instances of the application programs executing within the cloud-computing facility. One attraction of cloud-computing for cloud-computing clients is that the cloud-computing facility can scale computing services dynamically, based on demand, so that cloud-computing users pay only for the computing bandwidth that they need, at each point in time, rather than purchasing, managing, and maintaining large data centers adequate to handle peak-load demand. Cloud-computing facilities also provide highly available, automatically redundantly stored, and geographically dispersed data storage for cloud-computing clients on an as-needed basis at costs often significantly lower than cloud-computing clients could otherwise realize by purchasing, managing, and maintaining their own data-storage facilities. Cloud-computing facilities publish documentation on the various Internet-accessible interfaces they provide to cloud-computing customers, allowing cloud-computing customers to remotely contract for, configure, and use cloud-computing-facility-provided data storage and computational bandwidth.

In one approach, as shown in FIG. 3, the highly functional, cloud-connected interactive applications to which the current patent application is directed may interact, through a service interface 308 provided by the cloud-computing facility, with a cloud-resident application 310 that receives and stores digitally encoded content and other data on behalf of the highly functional, cloud-connected interactive applications and that retrieves and transmits to the highly functional, cloud-connected interactive applications electronically encoded content from the cloud-computing-facility data-storage facilities. The cloud-resident application 310 can receive the digitally encoded content in an application-specific format, re-encode the digitally encoded content, and store the re-encoded content using internal cloud-computing-facility data-storage interfaces. The cloud-resident application 310 may also undertake various types of data-security measures as well as authenticating and authorizing data storage and data access on behalf of instances of the highly functional, cloud-connected interactive applications.

Figure 4:
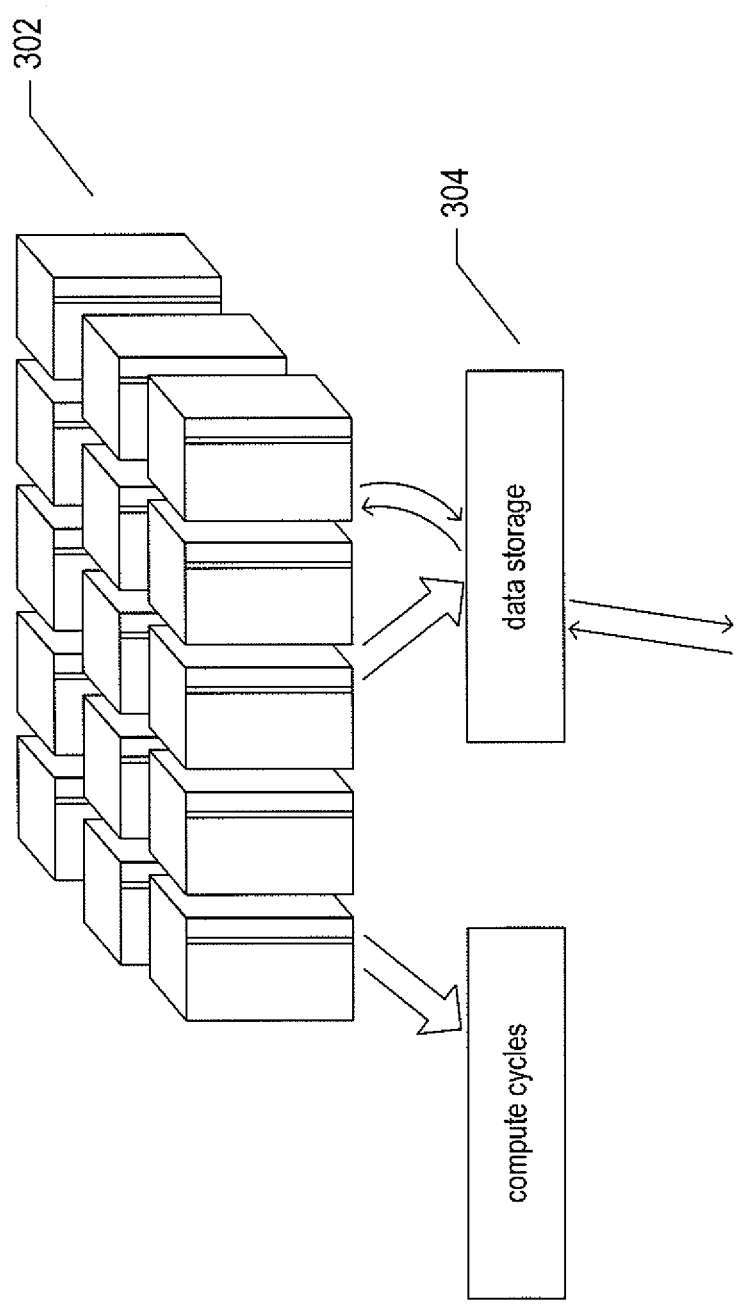
FIG. 4 illustrates a second cloud-computing data-storage method used by highly functional, cloud-connected interactive applications to which the current patent application is directed.
Figure 5:
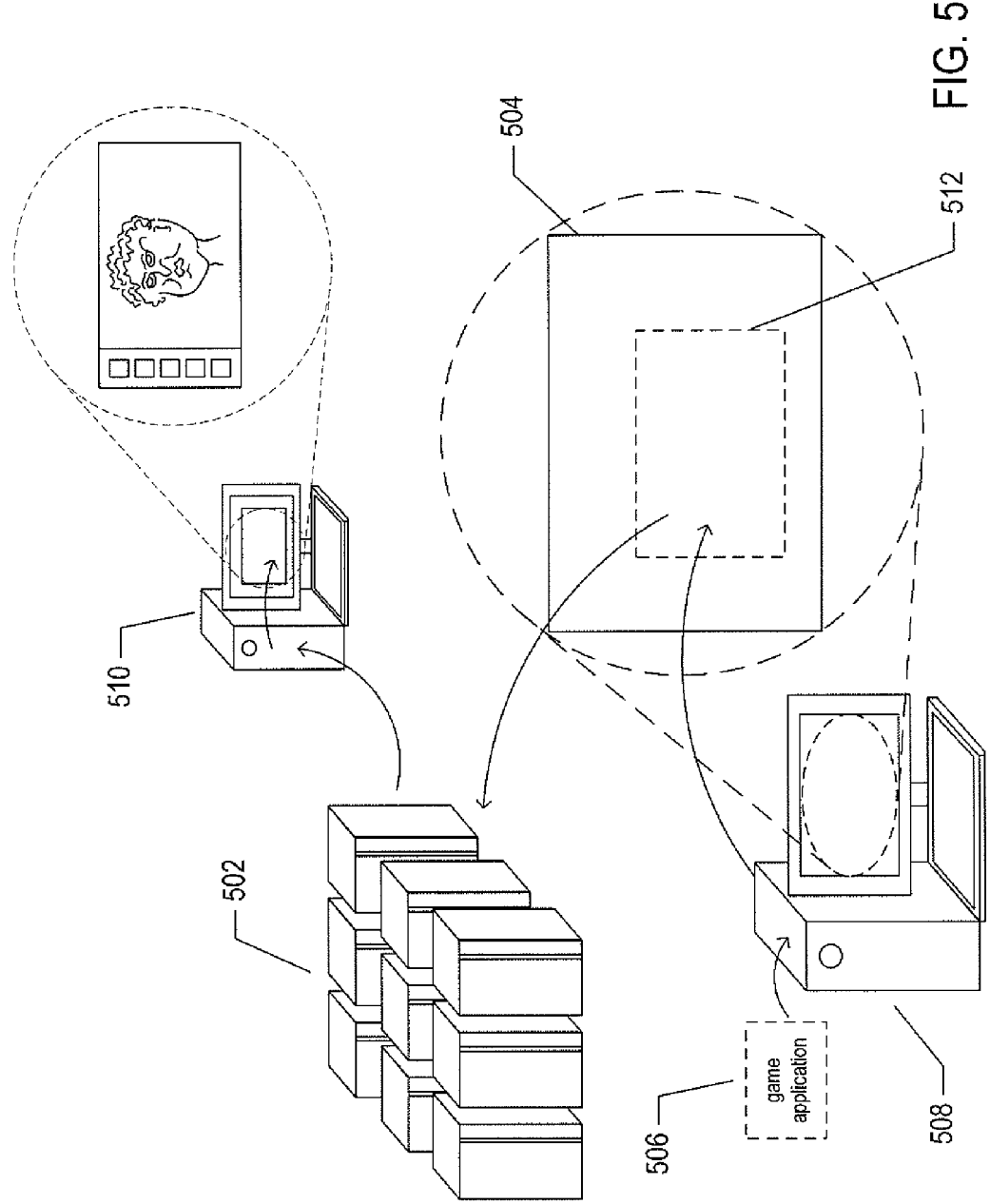
FIGS. 5-7 illustrate certain of the functionalities and services provided by a social-networking service that are used by the highly functional, cloud-connected interactive applications to which the current patent application is directed.
Figure 6:
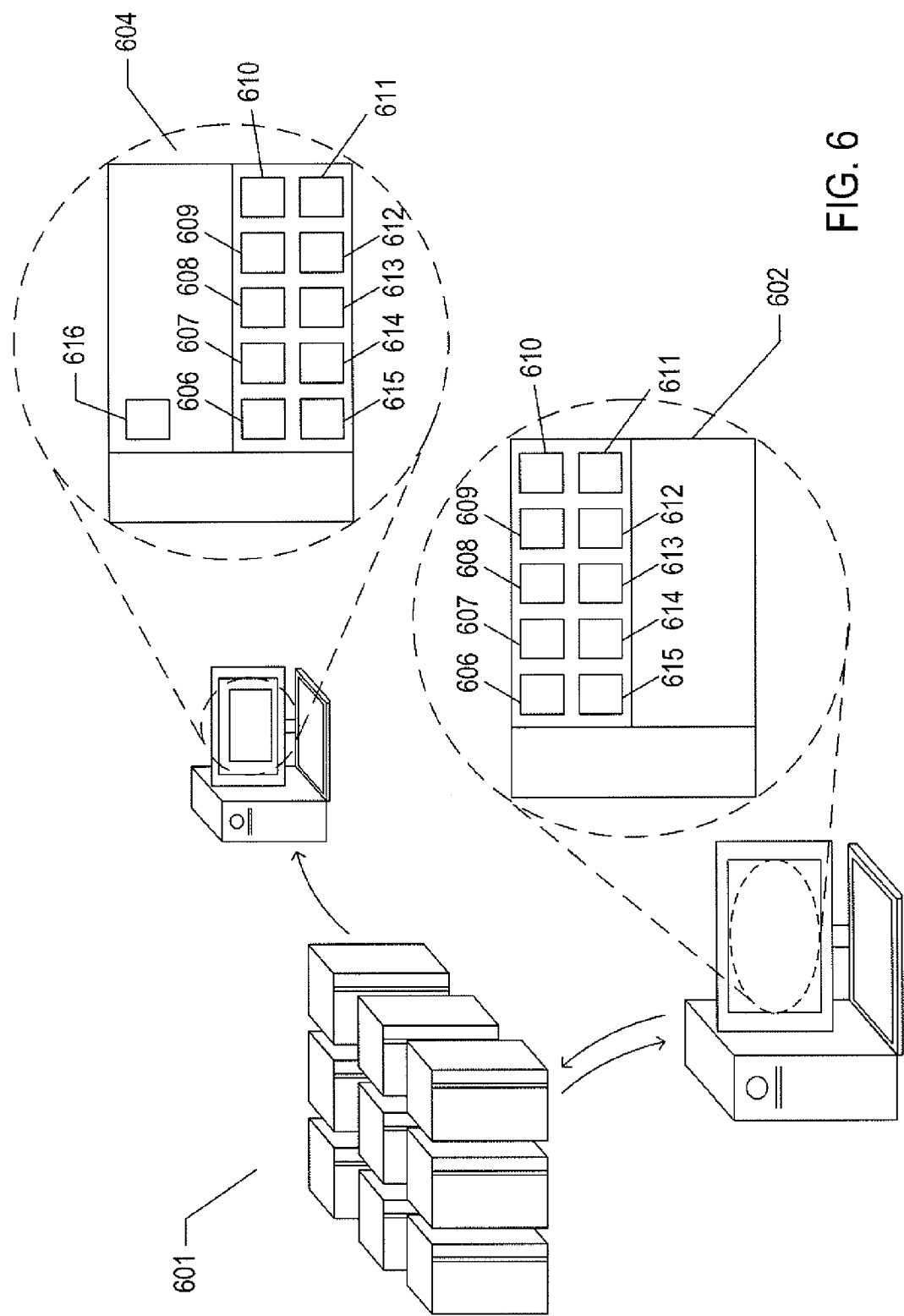
Figure 7:
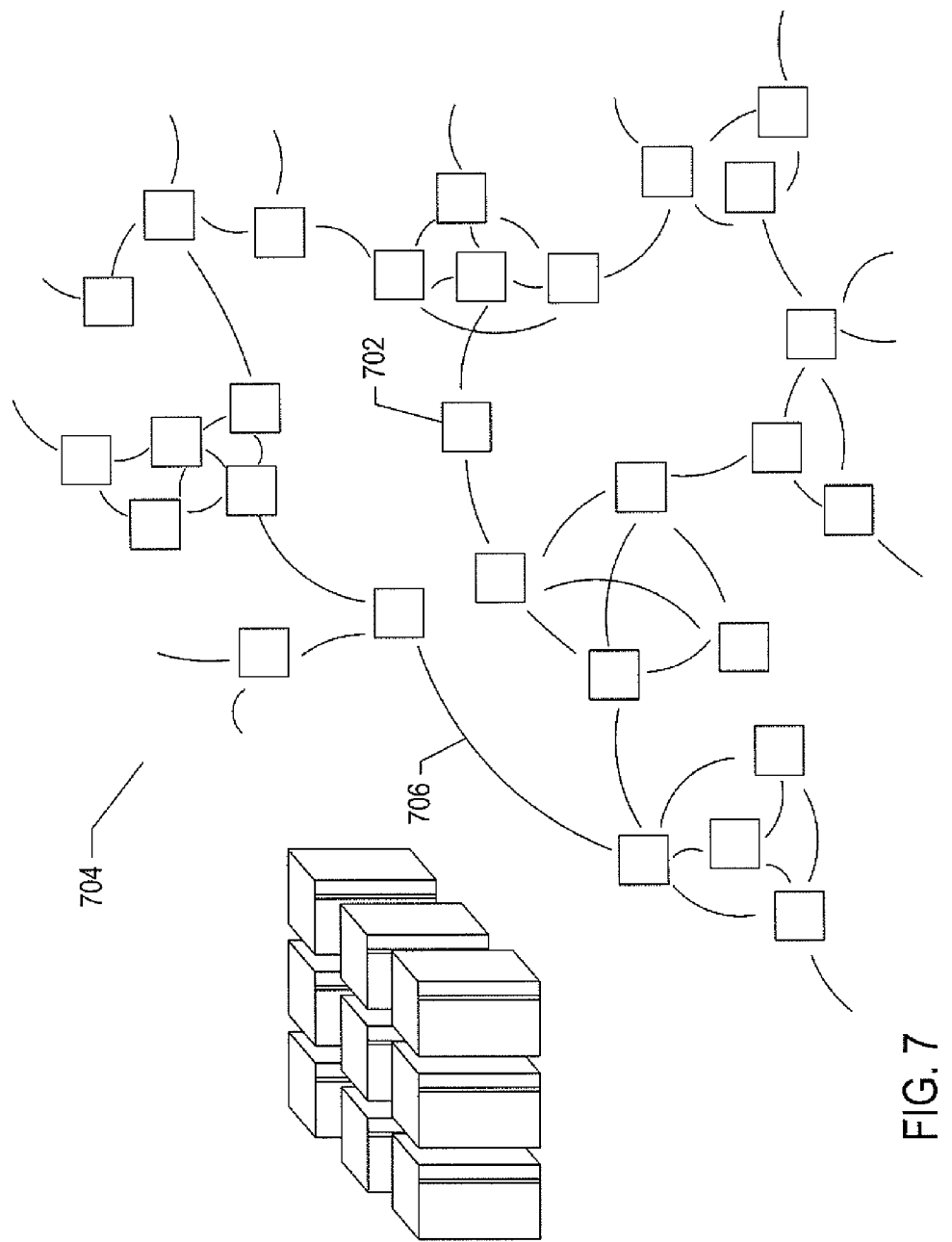

FIG. 4 illustrates a second cloud-computing data-storage method used by highly functional, cloud-connected interactive applications to which the current patent application is directed. In the second approach, the highly functional, interactive application directly interfaces with the data-storage interface 304 provided by the cloud-computing facility 302. There is no cloud-resident-application intermediary FIGS. 5-7 illustrate certain of the functionalities and services provided by a social-networking service that is used by the highly functional, cloud-connected interactive applications to which the current patent application is directed. As shown in FIG. 5, the social-networking facility 502 provides an interface 504, referred to by one social-networking facility as a "canvas page," to allow an application developer to incorporate an application program 506 developed on the application-developer's computer system 508 within the social-networking facility 502. Incorporation of an application program within a social-networking facility allows social-networking-facility users to access and execute the application program on the social-networking-facility-users' computer systems 510. The canvas page 504 allows the application developer to define a region 512 of a displayed social-networking page within which the user interface provided by the application program is displayed to application-program users. The interface and the facilities provided by social-networking facilities for incorporating application programs and for distributed use of application programs have become increasingly popular with game developers, as one example. An already large industry has quickly developed around the development and distributed use of game application programs within social-networking environments. In one social-networking facility, an application developer inputs a uniform resource locate ("URL") that represents the location of the application-program executable and other application-program-related files, which the cloud-computing facility then uses to access and download the application-program executable and other application-program-related files in order to incorporate the application program within the social-networking environment.

FIG. 6 illustrates one type of information-sharing service provided by a social-networking service to users of the social-networking service. In the information-sharing service shown in FIG. 6, each social-networking-service user is provided with one or more web pages 602 and 604 that display textual, graphical, and other types of information related to, or of potential interest to, the user within the social-networking context. For example, as shown in FIG. 6, a first user may post a number of photographic images 606-615 for display on the first user's one or more web pages 602. The social-networking facility 601 allows a second user, having obtained appropriate access rights to the first user's posted information, to retrieve and display the first user's posted images within the second user's one or more web pages 604. In general, social-networking services allow a wide variety of different types of information-sharing functionalities. In the example shown in FIG. 6, a second user may copy one or more of the first user's images as a post to the second user's web page 616, allow additional users to access the one or more posted images from the second-user's web page. As another example, users identified as friends or correspondents of the first user may automatically receive information posted by the first user to the first user's web page or web pages. The information-sharing and information-distribution facilities provided by social-networking services can be accessed by application programs through published and documented social-networking-service interfaces.

FIG. 7 shows an additional set of functionalities provided by social-networking services to social-networking-service users. As shown in FIG. 7, the users, each represented by a small rectangle, such as rectangle 702, can self-associate, using social-networking-service functionality and interfaces, to form one or more social networks or social graphs 704. FIG. 7 shows a small portion of a social graph 704 in which users are linked by edges, such as edge 706, which represent various types of social relationships. A social-networking service generally provides a rich set of tools that allows users to navigate social graphs and interact with other users discovered during social-graph navigation.

Figure 8:
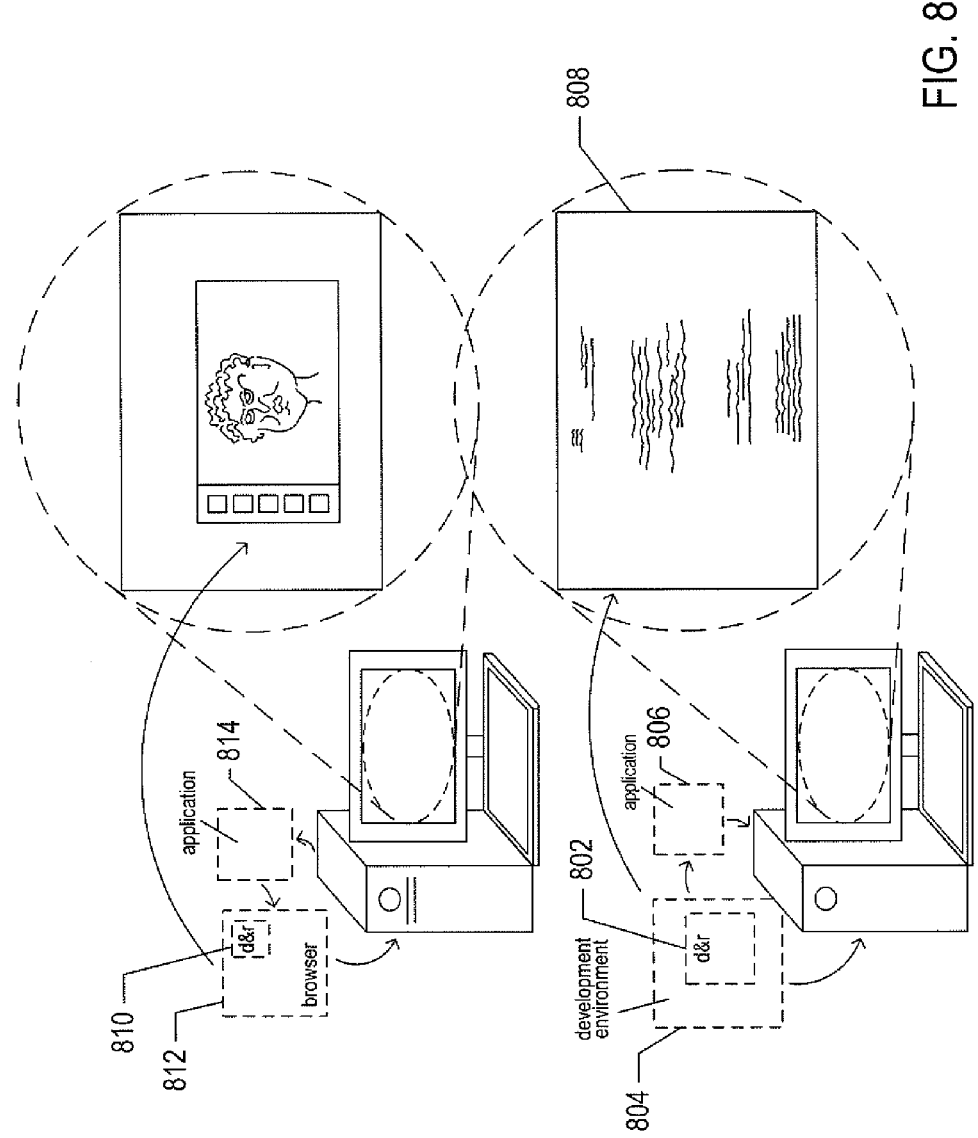
FIGS. 8-9 illustrate functionalities provided by, entities associated with, and the internal architecture of a development-and-runtime system ("D&R") that is used by application developers to develop highly functional applications for execution within the context of various different types of web browsers and over a wide variety of different types of computing platforms.
Figure 9:
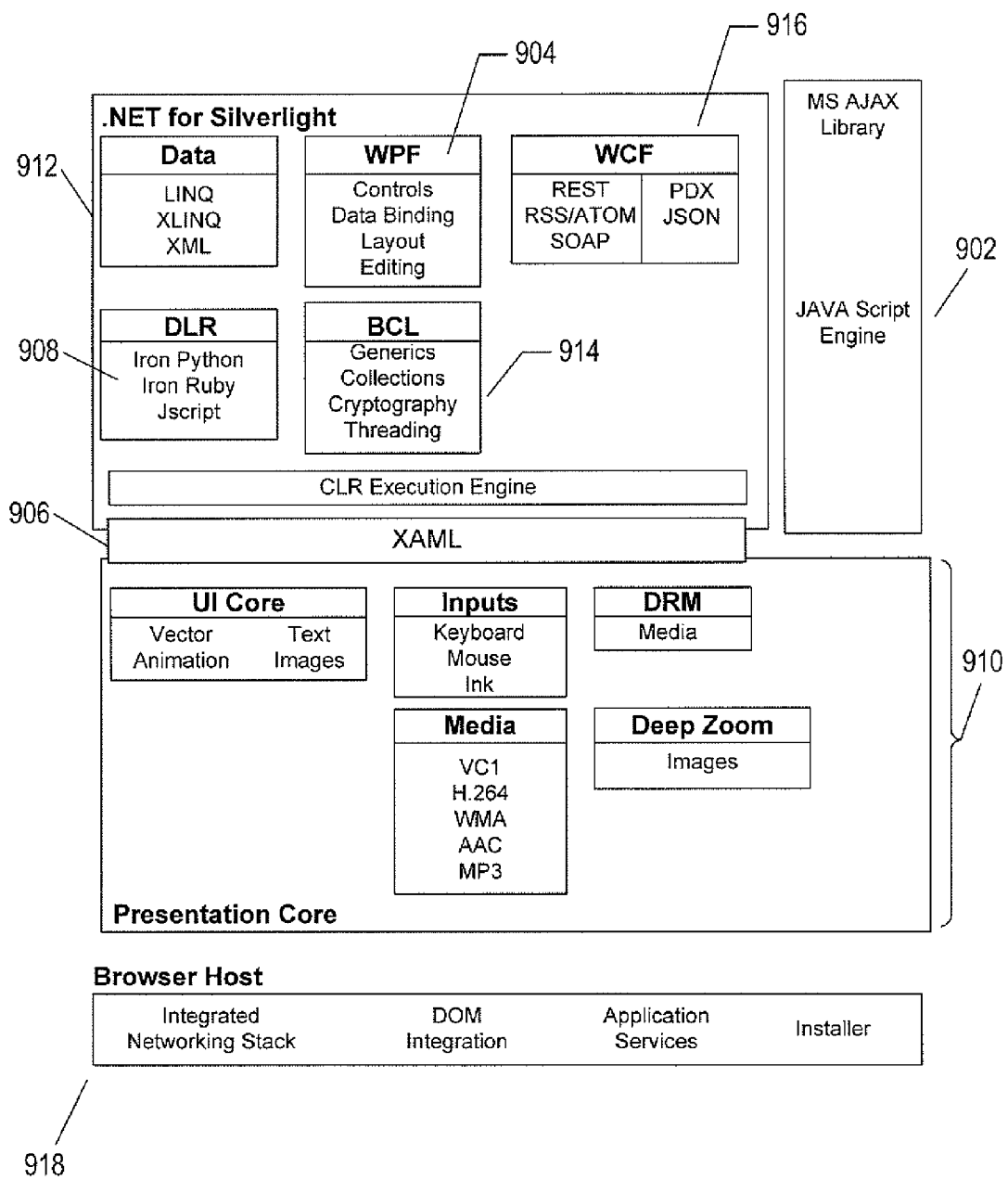

FIGS. 8-9 illustrate functionalities provided by, entities associated with, and the internal architecture of a development-and-runtime system ("D&R") that is used by application developers to develop highly functional applications for execution within the context of various different types of web browsers and over a wide variety of different types of computing platforms. As shown in FIG. 8, one aspect of the D&R is a set of facilities and tools 802 that can be imported together into many different types of development environments 804 which developers use to create application programs 806. The development environments, as one example, provide complex and highly functional user interfaces 808 that allow application developers to program applications and to include calls to a variety of different types of functional interfaces provided by the D&R. The D&R also provides routine libraries and references to local and remote routines that implement the functionality and tools invoked by application programs written by developers using the D&R-enhanced development environments.

Another aspect of the D&R system is that an application-program user can download a D&R plug-in 810 within the user's browser 812 to support execution of application programs developed by the developer using a D&R-enhanced development environment. Thus, D&R plug-in provides a wide variety of runtime functionality to allow application programs to execute 814 within a browser context. The D&R plug-ins provide common functionalities that can be incorporated into a wide variety of different types of browsers to support execution of application programs within different types of browser contexts on a wide variety of different computing platforms.

FIG. 9 provides a block diagram of the architecture for the Microsoft Silverlight™ D&R system. The Silverlight D&R system includes extensive user-interface functionalities 904 and 906, extensions to common language and dynamic language runtimes 908, and a large number of specific user-interface tools and capabilities 910. The Silverlight D&R also includes data-access and data-processing functionalities 912, a base class library 914, and window communications foundation 916. The D&R architecture is developed to operate within the host-browser context and host-browser-provided functionality and facilities 918.

Figure 10:
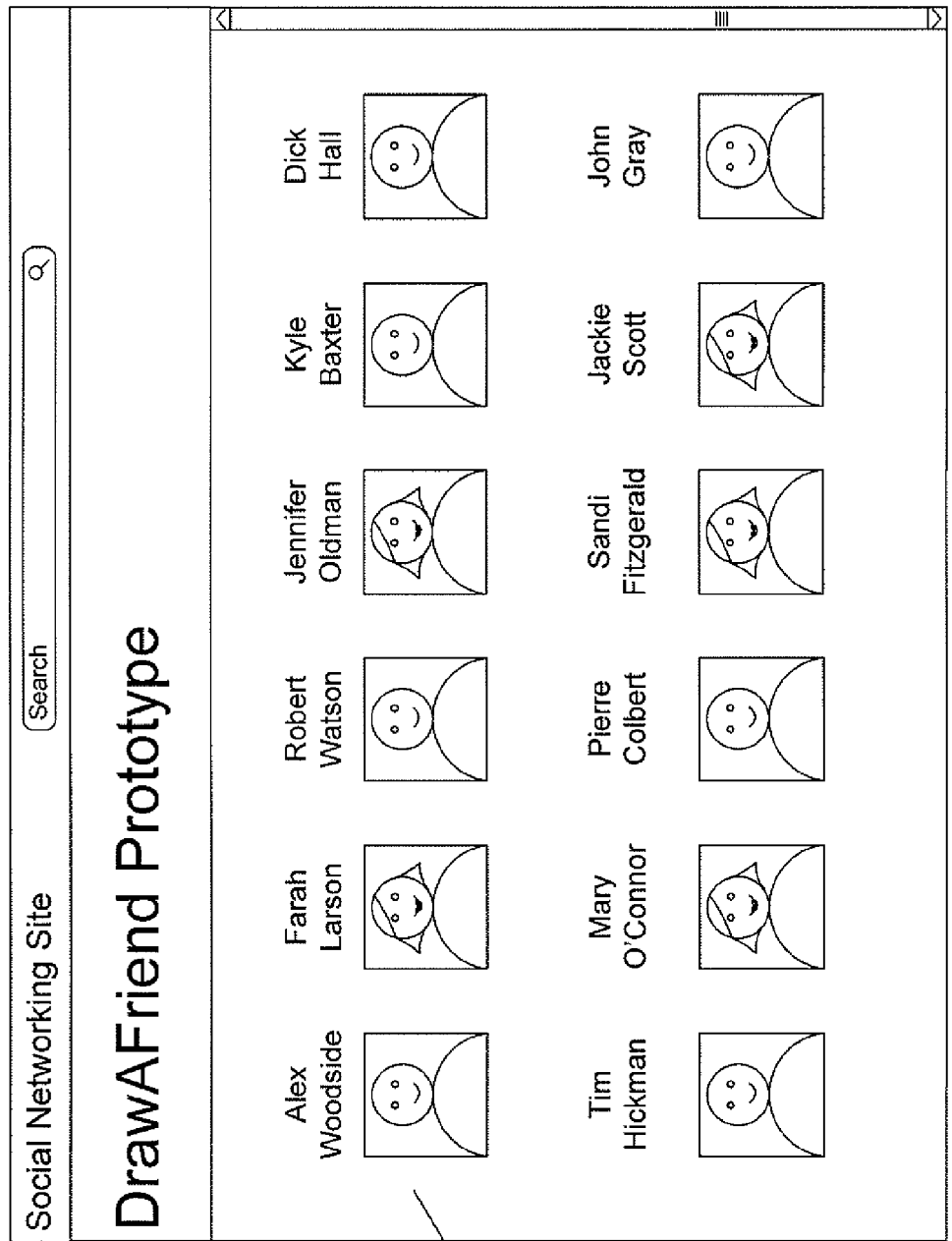
FIGS. 10-18 illustrate, using screen-capture images, operation of a highly functional, cloud-connected, interactive application program to which the current patent application is directed within a social-networking environment.
Figure 11:
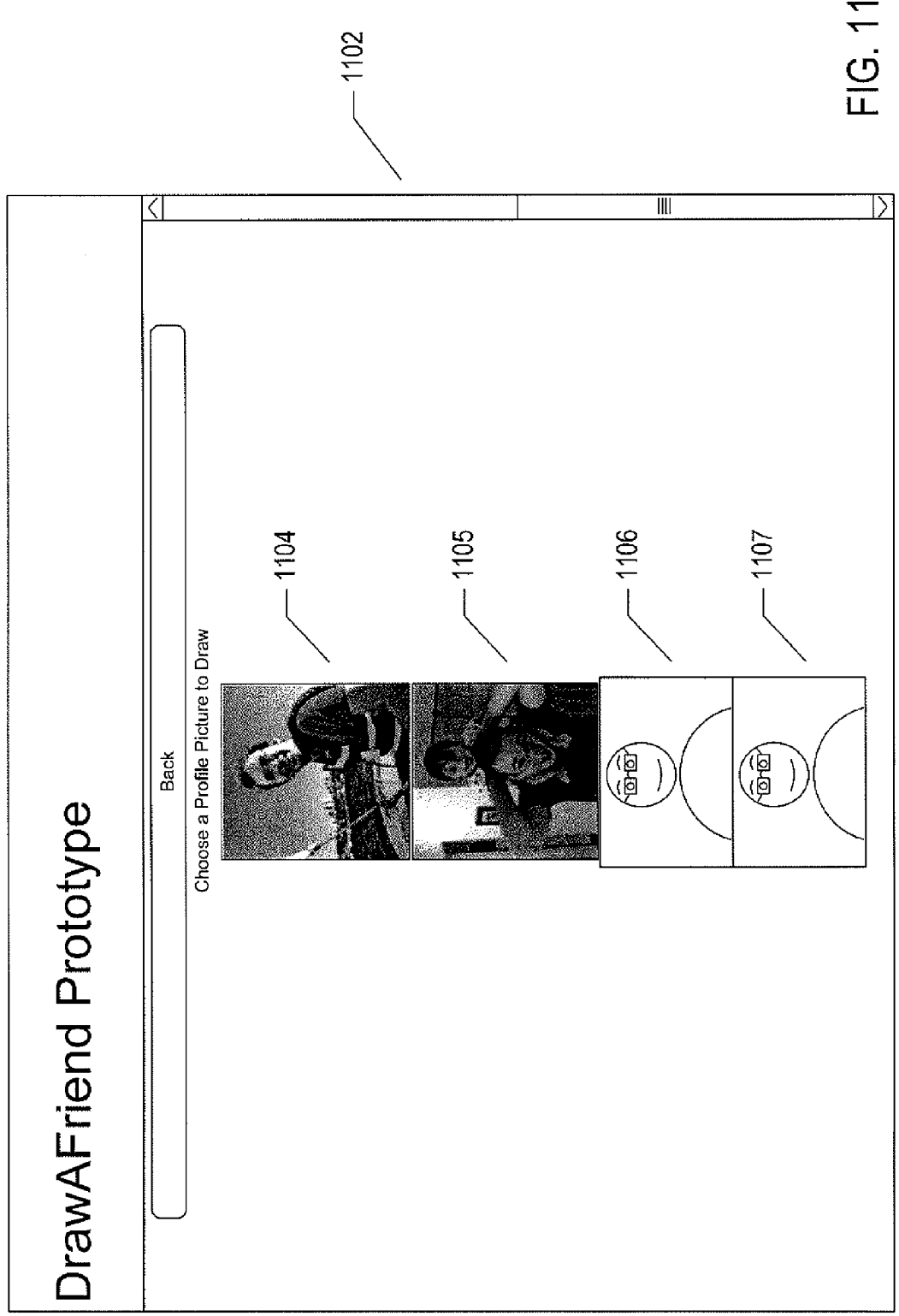

FIGS. 10-18 illustrate, using screen-capture images, operation of a highly functional, cloud-connected, interactive application program to which the current patent application is directed within a social-networking environment. The highly functional, cloud-connected interactive application is a portrait-drawing application called "DrawAFriend." As shown in FIG. 10, when invoked, the DrawAFriend application provides a thumbnail-portrait-associated list of friends of the user to allow the user to select a friend to draw a portrait of. For example, in the displayed list of friends, the friend "Alex Woodside" 1004 is associated with a portrait of Alex Woodside 1006. By inputting a mouse click, or by another type of user-input operation, directed to a particular friend, that friend is selected by DrawAFriend, which then displays a set of portraits or images for the friend in a friend-images display interface 1102, shown in FIG. 11. In the friend-images display interface shown in FIG. 11, four images of Alex Woodside 1104-1107 are displayed. Both the initial list of friends annotated with thumbnails 1002 and the friend-images display interface 1102 are obtained by the DrawAFriend application through a social-graph interface and other interfaces provided by a social-networking service.

Figure 12:
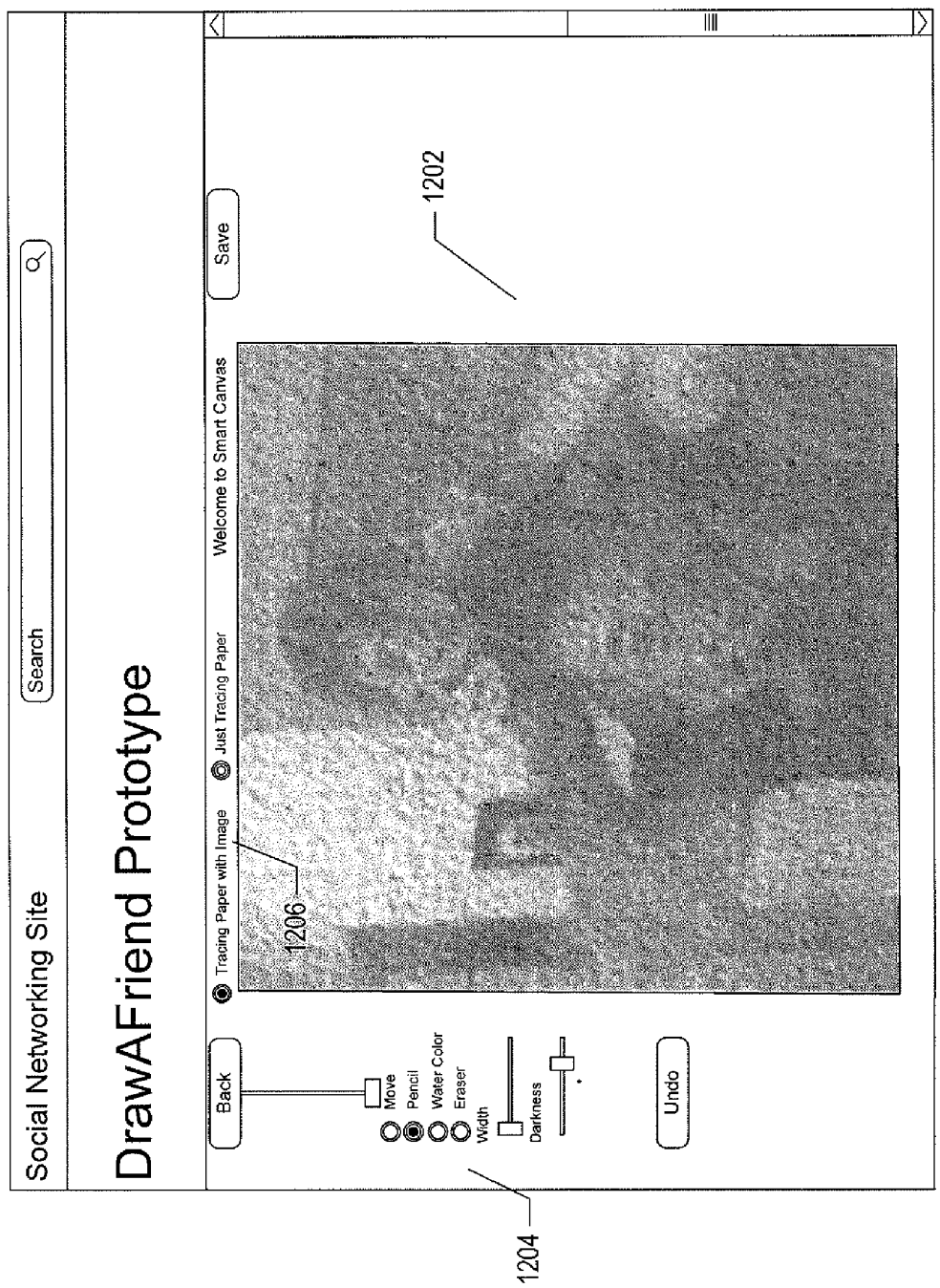

When a particular image from the set of images for a particular friend 1102 is selected by user input, the DrawAFriend application prepares a drawing user interface 1202 as shown in FIG. 12. The drawing user interface superimposes a semi-transparent drawing surface over the selected image of the friend, essentially an electronic canvas on which a user can use the user's mouse or another navigational device or input method to draw lines and to color the electronic canvas, using the image below the semi-transparent electronic canvas as a guide. User-interface controls 1204 are provided to select the type of drawing tool, including a pencil, watercolor brush, or eraser, and to control the width and darkness of the marks made by the drawing tool. The drawing user interface also provides various options, including providing the electronic canvas with an underlying image or providing only the electronic canvas 1206. Other user-interface features allow the portrait created by the user to be saved, allow certain strokes and electronically drawn content to be erased, and allow for other types of operations, including importing lines and coloration into the electronic canvas from the underlying image.

Figure 13:
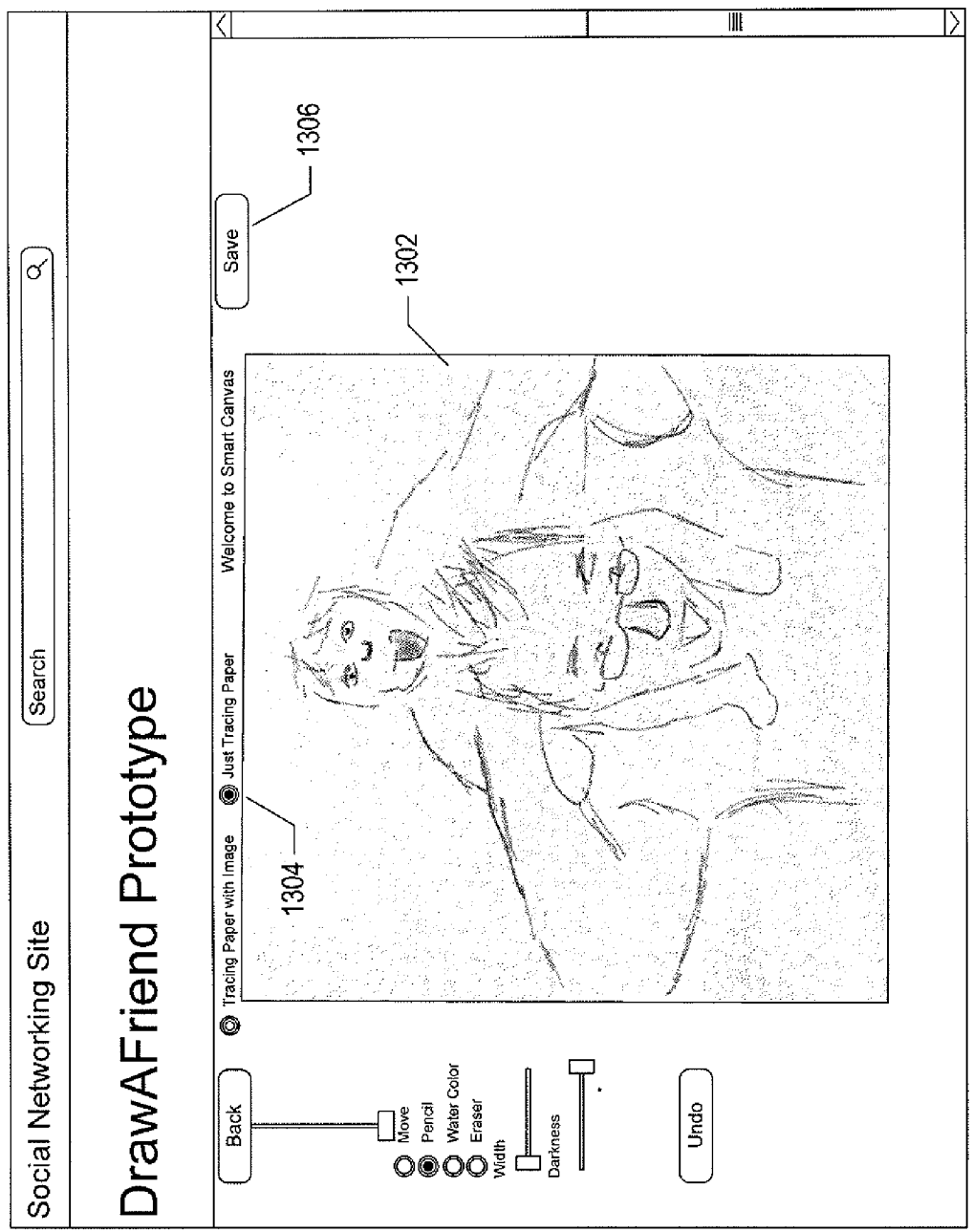
Figure 14:
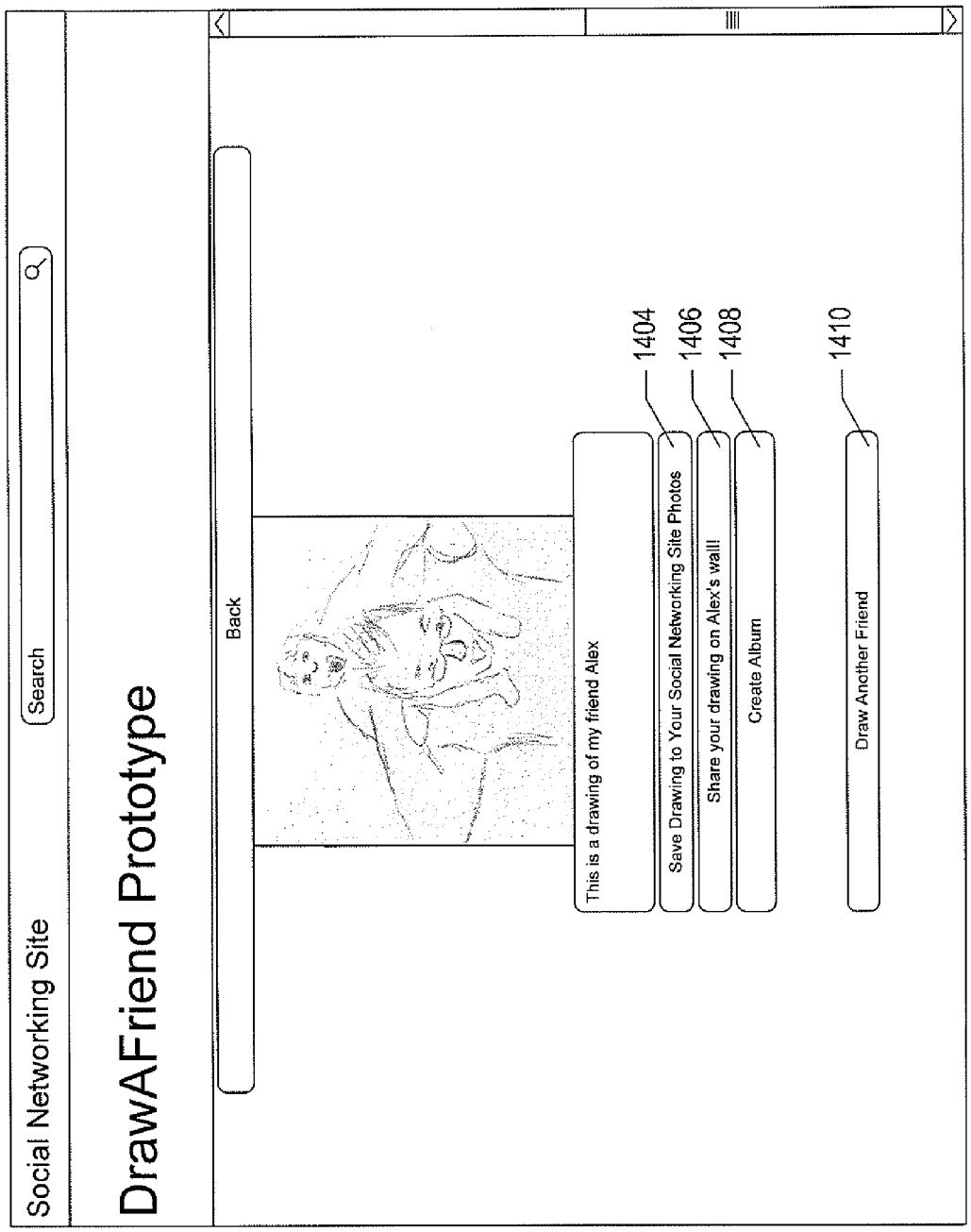
Figure 15:
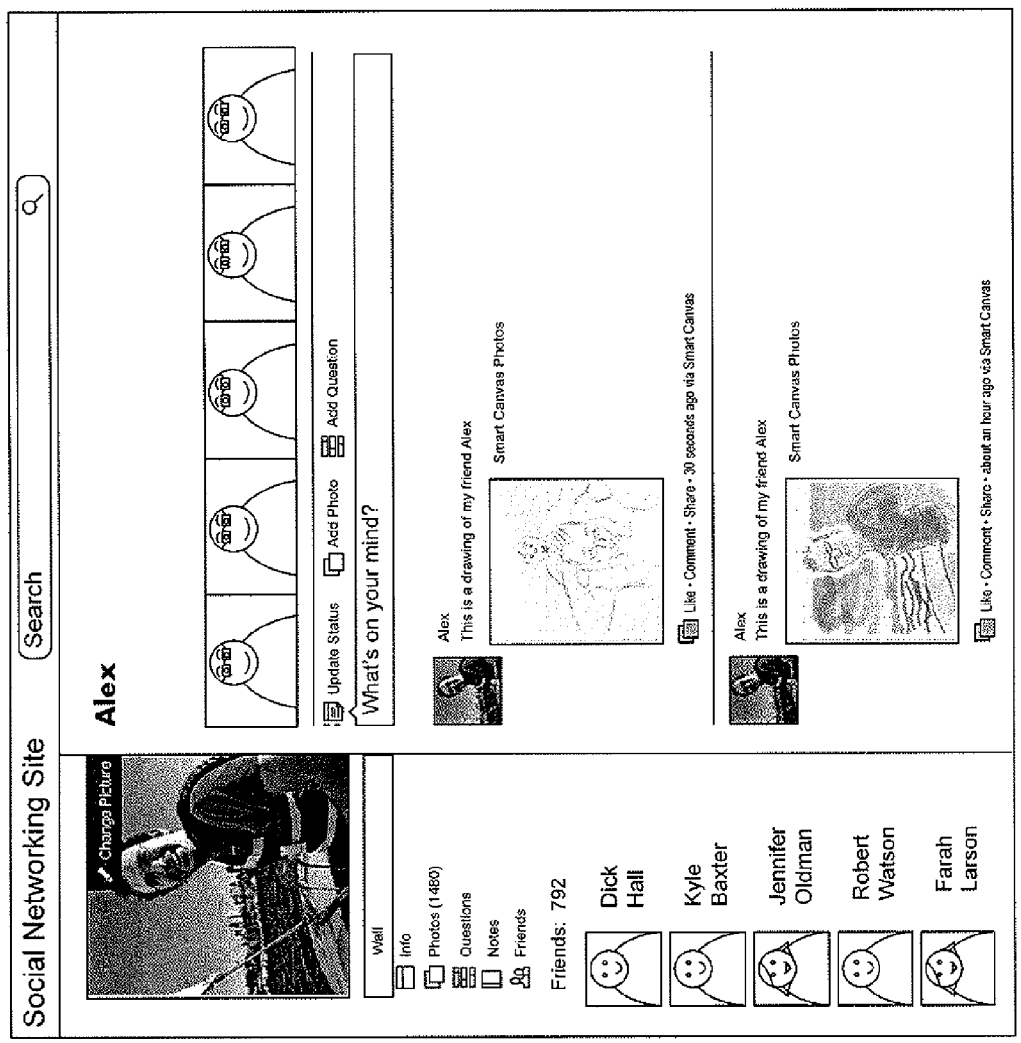

FIG. 13 shows a completed drawing based on the selected image (1105 in FIG. 11) of Alex Woodside. The drawing 1302 is displayed by the DrawAFriend application without the underlying image, as selected by input to user-interface feature 1304. Input to the "save" user-input feature 1306 a next user-interface display 1402 shown in FIG. 14. This display allows the user to save the drawing within the social-network service, as initiated by inputting an indication to user-interface feature 1404, share the drawing with the user's friends, as initiated by inputting user input to user-interface feature 1406, store the drawing in an album created by the user, as initiated by input to user-interface feature 1408, or continue drawing portraits by selecting another friend, as initiated by input to user-interface feature 1410. FIG. 15 illustrates one of Alex Woodside's social-networking web pages, provided by the social-networking service, to which the drawing created using the DrawAFriend application has been posted, as initiated by user input to user-interface feature 1406 shown in FIG. 14. The drawing 1502 is shown posted to Alex Woodside's wall in the Facebook social-networking service.

Figure 16:
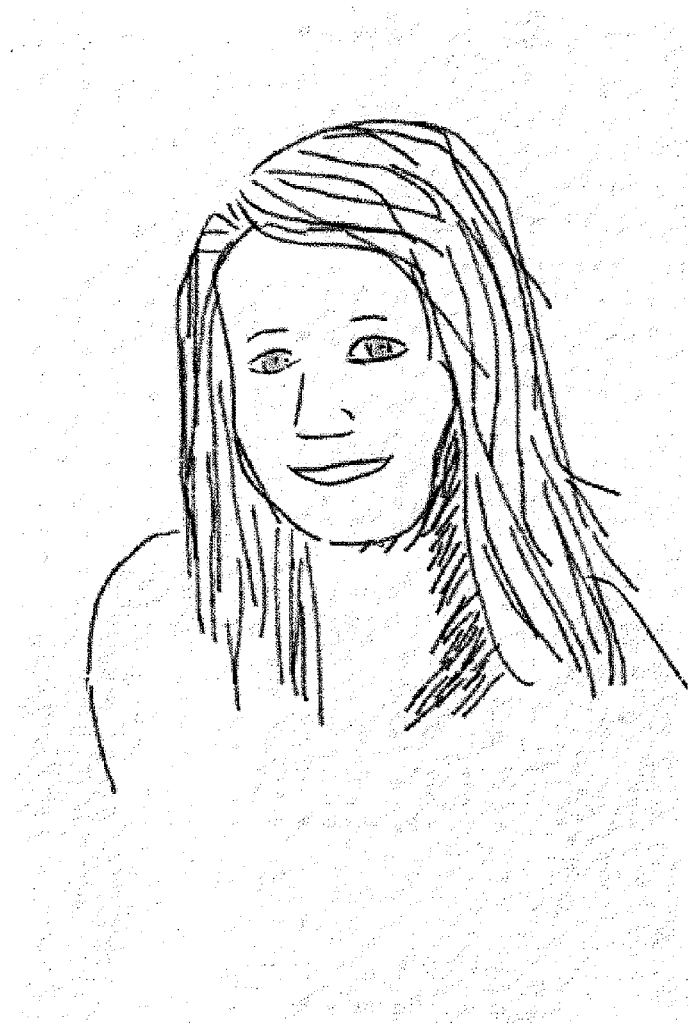
Figure 17:
Figure 18:
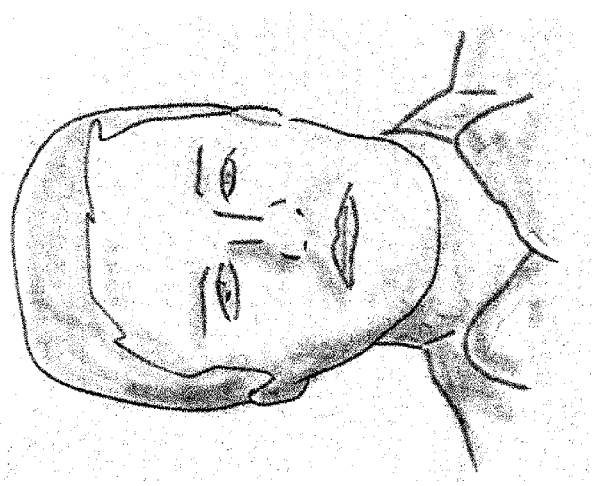

FIGS. 16-18 illustrate various different types of drawings that can be created using the DrawAFriend application. These include pencil-like drawings, an example of which is shown in FIG. 16, watercolor-like drawings, an example of which is shown in FIG. 17, and pencil-and-watercolor drawings, an example of which is shown in FIG. 18.

Figure 19:
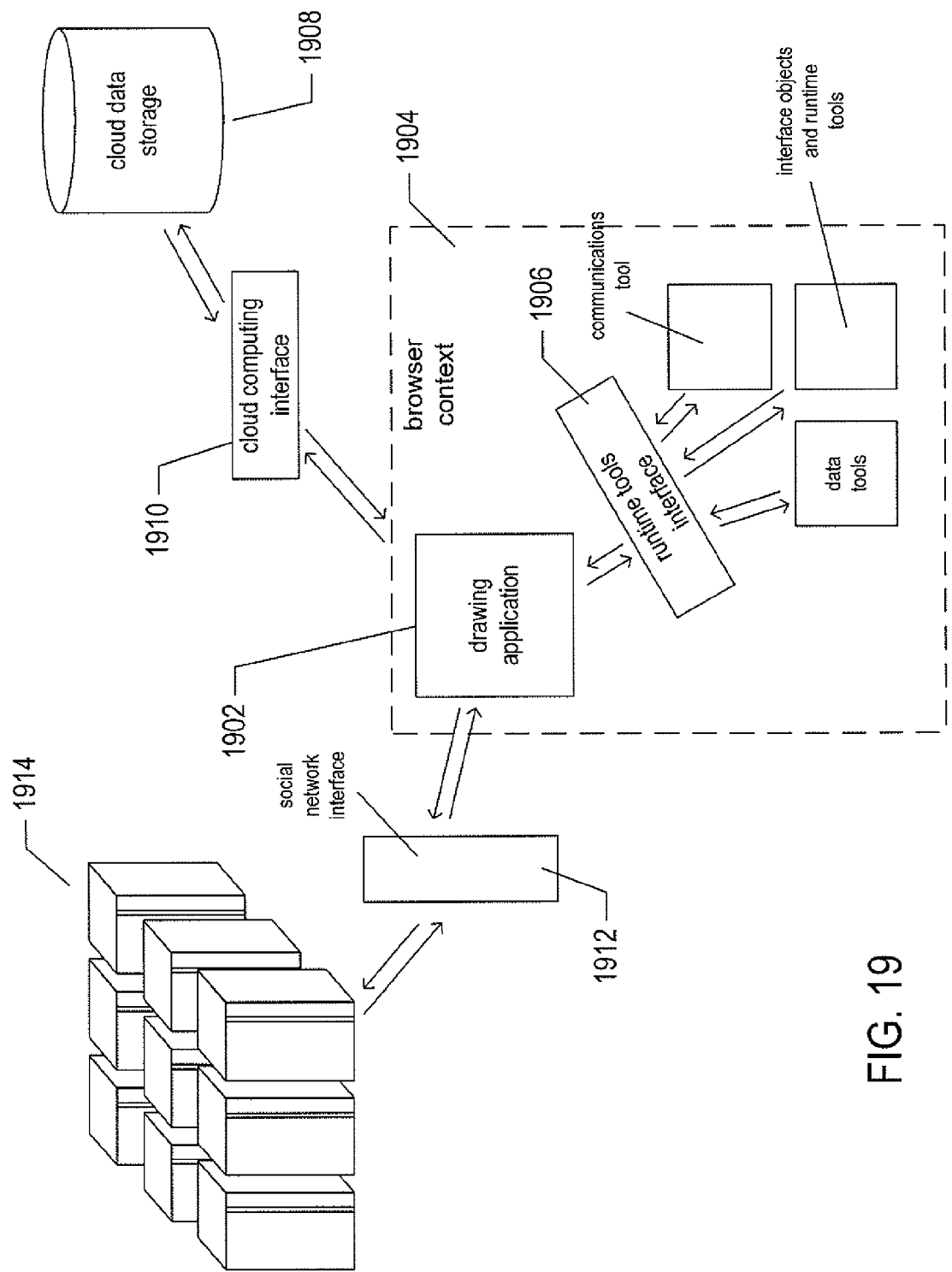
FIG. 19 illustrates the interfaces to which the class of highly functional, cloud-connected interactive applications to which the current patent application is directed interface, as a summary of the full context within which the highly functional, cloud-connected interactive applications execute.

FIG. 19 illustrates the interfaces to which the class of highly functional, cloud-connected interactive applications to which the current patent application is directed interface, as a summary of the full context within which the highly functional, cloud-connected interactive applications execute. The application 1902 executes within a web-browser context 1904 on a user's computer system. The drawing application interfaces to the D&R plug-in interface 1906, discussed above with reference to FIG. 8, in order to access various D&R runtime tools and functionalities as well as to access runtime tools and functionalities provided by the browser, within the context of which the application 1902 executes. By interfacing with the D&R interface 1906, the drawing application can execute within any browser for which the D&R system is available and into which a D&R plug-in has been imported, and can run on any computing platform that supports execution of the wide variety of browsers that support the D&R plug-in. In addition, the highly functional, interactive application 1902 stores data on, and retrieves data from, a cloud-computing data-storage facility 1908 through a cloud-computing interface 1910, as discussed above with reference to FIGS. 3-4. Finally, as discussed above with reference to FIGS. 5-6, the highly functional, interactive application 1902 accesses, through a social-networking-service interface or interfaces 1912, to a wide variety of functionalities provided by a social-networking service 1914. In one implementation, the drawing application program, described above with reference to FIGS. 10-18, interfaces to a D&R interface 1906 in order to provide the interactive drawing user interface and tools shown in FIGS. 10-18. The D&R interface allows the drawing application to display an image, create and display the semi-transparent electronic canvas, display and receive user input through various user-interface features, and provide various functionalities, as discussed above. The drawing application 1902 interfaces to the cloud-computing interface 1910 in order to store completed, digitally encoded drawings, produced by a user or users employing the drawing application, in cloud data-storage facilities, including, in certain implementations, storing each of the various drawing strokes and/or other inputs in a drawing-associated log file. This allows a user to replay some or all of the drawing operations, at a later date, and resume drawing from a state stored in the log file. This also allows users to replay the drawing and begin their own drawing from the final, or some intermediate, drawing state produced by another user. The drawing application 1902 interfaces to the social-networking interface 1912 in order to access one or more social graphs in order to identify friends and import images from those friends' social-networking pages, to store completed portraits within the social-networking service, to post completed portraits to friends and other users of the social-networking service, and to carry out other such operations.

Figure 20:
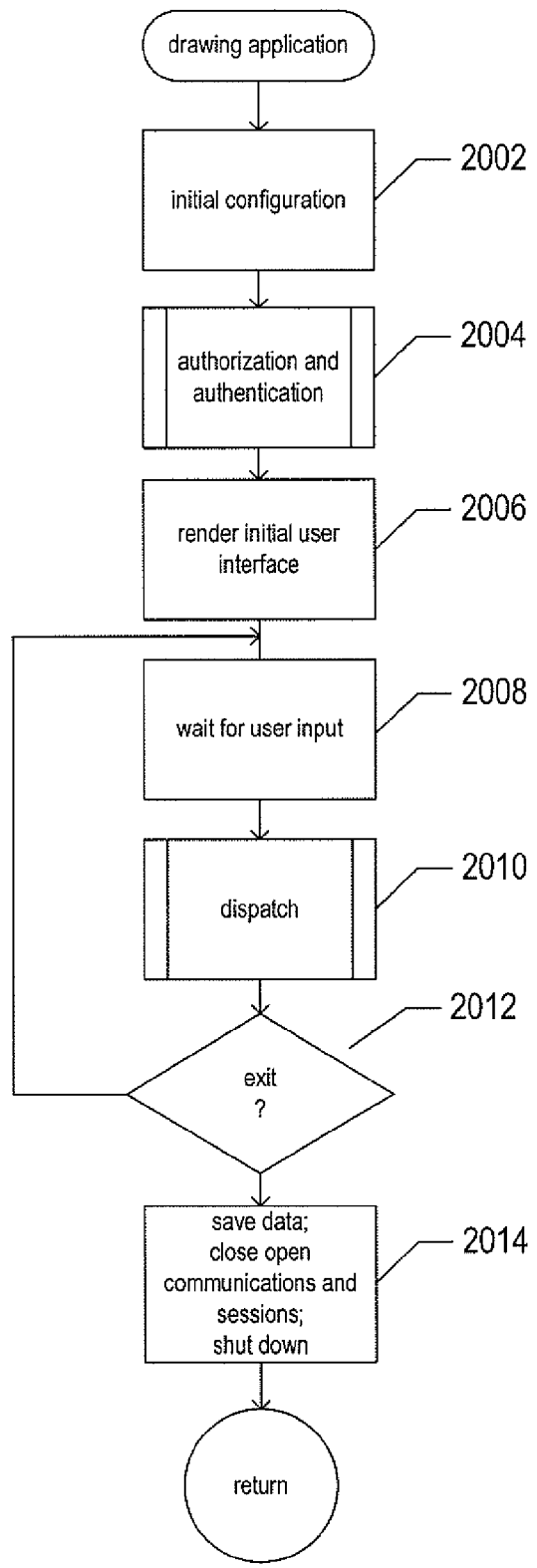
FIGS. 20-22 provide control-flow diagrams that illustrate operation of one implementation of the DrawAFriend application, which is designed to execute in a browser-independent and computing-platform-independent fashion in the context of a social-networking environment.
Figure 21:
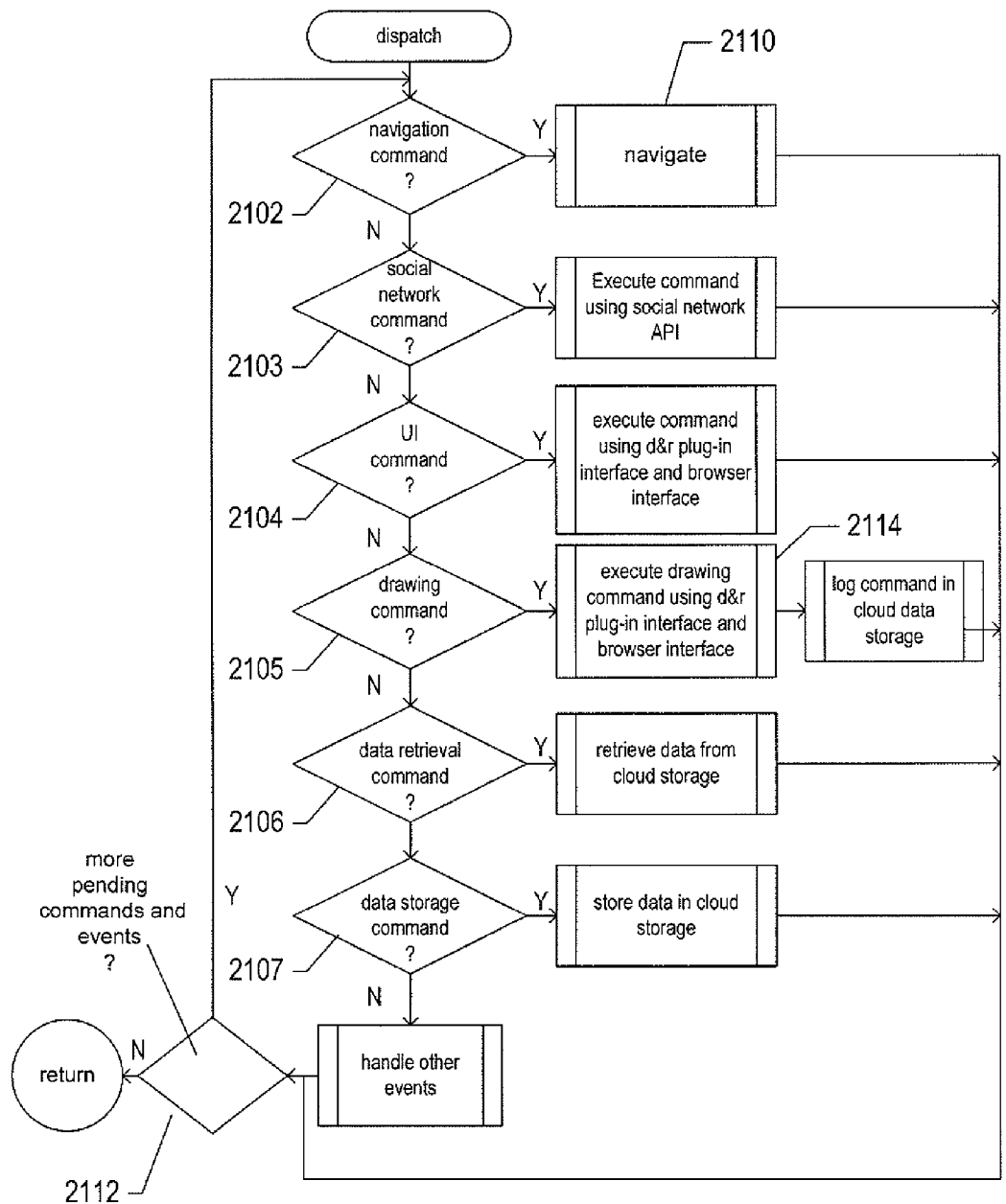
Figure 22:
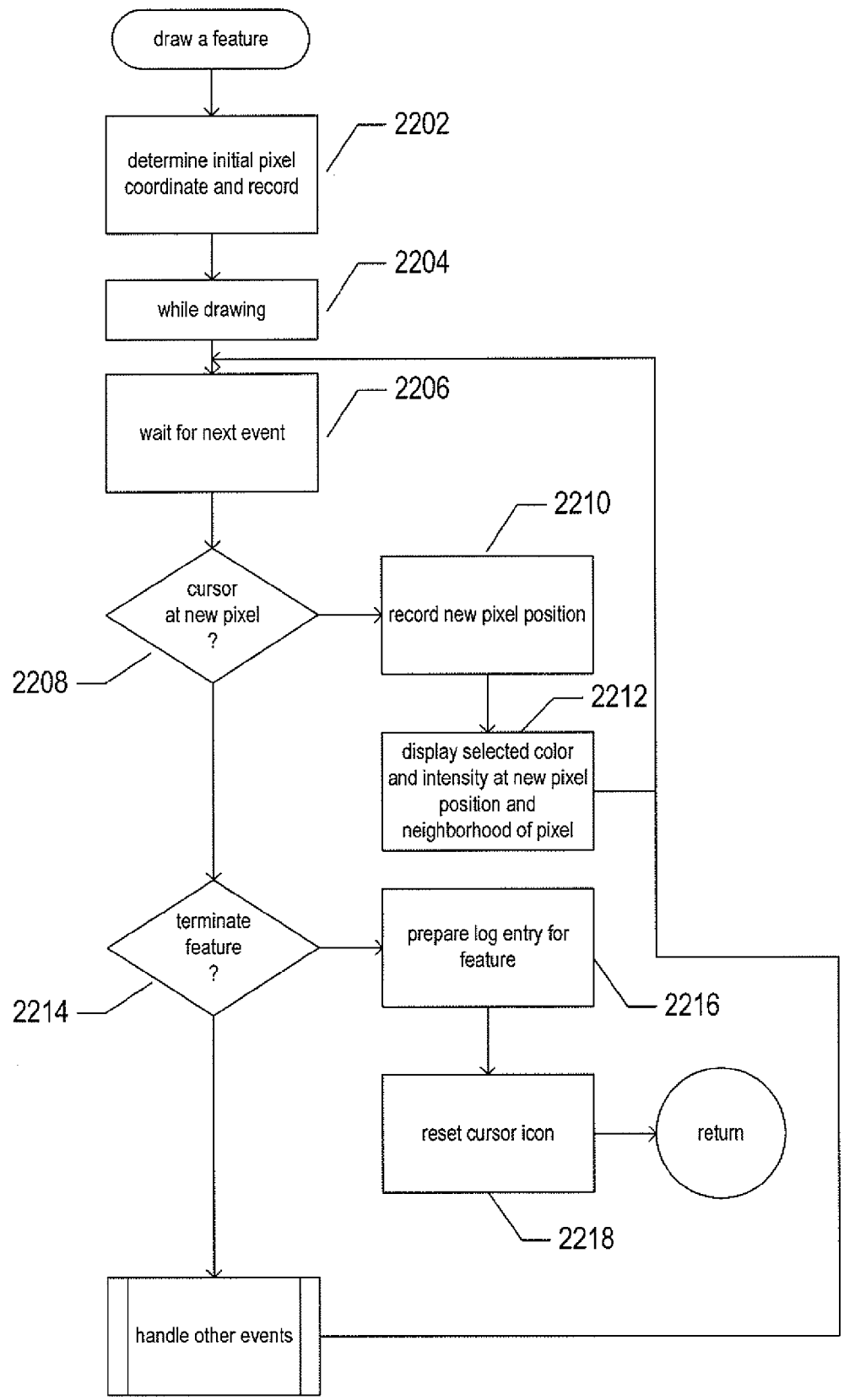

FIGS. 20-22 provide control-flow diagrams that illustrate operation of one implementation of the DrawAFriend application, which is designed to execute in a browser-independent and computing-platform-independent fashion in the context of a social-networking environment. FIG. 20 provides an overall operational control-flow diagram. In step 2002, the DrawAFriend application is invoked by user input to the user's web browser and carries out initial configuration operations. In step 2004, the user's web browser interacts with the user to authorize and authenticate execution of the application, in certain cases employing functionality provided by either or both of the D&R system and the social-networking system through which the DrawAFriend application is accessed. Next, in step 2006, the DrawAFriend application configures and displays, to the user, an initial user interface, such as the friend-selection interface shown in FIG. 10. The DrawAFriend application then enters a continuous loop in which the DrawAFriend application waits for user input or other events, in step 2008, and then calls a dispatch routine, in step 2010, to handle user events and other events that occur. When an event results in termination of the DrawAFriend application, as determined in step 2012, the DrawAFriend application, in step 2014, may save data, including a current drawing log file, closes open connections and sessions, and then shuts down.

FIG. 21 illustrates the dispatch routine called in step 2010 in FIG. 20. The dispatch routine comprises a set of conditionals 2102-2107 which each determines whether the event that resulted in invocation of the dispatch routine is a particular type of event and, when the event is the particular type of event, the occurrence of which is evaluated by the conditional, calls a corresponding event-handling routine. For example, when the event is a navigation command, as determined by conditional 2102, a navigate event handler is called in step 2110. Event handling routines may themselves generate events that are stacked for subsequent handling, either within the dispatch routine, as detected in conditional 2112, or in a next iteration of the continuous loop comprising steps 2008, 2010, and 2012 in FIG. 20. The event-handling routines may access, through the various interfaces discussed above in FIG. 19, the D&R plug-in, the cloud-computing interface, and the social-networking-service interface.

FIG. 22 provides a control-flow diagram that indicates how drawing commands are handled by a routine invoked by the drawing-command event handler 2114 in FIG. 21. In step 2202, the initial position of a displayed cursor within the electronic canvas is determined and recorded. Then, in a continuous while-loop beginning at step 2204, while the drawing operation is carried by a user, the feature-drawing routine waits for a next user-input event, in step 2206, and handles events detected by the routine in subsequent steps. For example, when a user has positioned a cursor on a next pixel within the displayed electronic canvas, as determined in step 2208, the pixel position is recorded in step 2210 and the pixel and any appropriate neighboring pixels are displayed with the appropriate color and intensity to reflect having been placed in the path of a drawing tool during a drawing operation, in step 2212. When a terminate-drawing-operation input is received, as determined in step 2214, then the drawing routine prepares a log entry for the completed stroke or other result of the completed drawing operation, in step 2216, and then, in step 2218, resets the cursor icon or provides another indication, through the drawing user interface, of the completion of the drawing operation in step 2218.

Although the present invention has been described in terms of particular embodiments, it is not intended that the invention be limited to these embodiments. Modifications within the spirit of the invention will be apparent to those skilled in the art. For example, the highly functional, cloud-connected interactive applications to which the current patent application is directed may interface to any of a variety of different cloud-computing facilities, social-networking facilities, and D&R systems. The highly functional, cloud-connected interactive applications may be developed using any of many different programming languages, and many different implementations can be obtained by varying any of many different implementation parameters, including control structures, data structures, modular organization, and other such implementation parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An interactive computer system comprising:
   one or more processors;
   one or more electronic memories;
   a display device;
   an interactive application that is stored in the one or more electronic memories and that executes within a web-browser context on the one or more processors to control operation of the interactive computer system, the interactive application accessing social-networking services, accessing user-interface tools and routines through a runtime interface provided by a web-browser plug-in, and accessing a cloud-computing data-storage interface to store and retrieve data to and from a cloud-computing facility;
   wherein the interactive application displays a drawing user interface on the display device through which a human user draws portraits to produce digitally encoded content; and
   wherein the digitally-encoded content is stored in one or more physical data-storage devices of the social-networking services within the cloud-computing facility.

2. The interactive computer system of claim 1 wherein the drawing user interface includes:
   a semi-transparent electronic canvas;
   drawing tools invoked through user-input features; and
   a first user-input feature that, when invoked by user input, initiates storing operations that electronically store a drawing displayed on the semi-transparent electronic canvas.

3. The interactive computer system of claim 2 wherein the semi-transparent electronic canvas is overlaid by the interactive application over an image that provides a drawing guide.

4. The interactive computer system of claim 3 wherein the drawing user interface provides tools that import color and or portions of the image into the overlying semi-transparent electronic canvas.

5. The interactive computer system of claim 1 wherein the interactive application provides an interface that allows a user to retrieve a log file stored in the cloud-computing facility and replay drawing operations stored in the log file.

6. The interactive computer system of claim 1 wherein the interactive application is accessible to users of the social-networking services.

7. The interactive computer system of claim 1 wherein the interactive application displays a user-interface feature that, when invoked by user input, initiates a posting operation that posts the drawing displayed on the semi-transparent electronic canvas to social-networking-service-supplied web pages.

8. A specialized portrait-drawing computer system comprising:
   one or more processors;
   one or more electronic memories;
   a display device;
   a drawing user interface, controlled by an application stored in the one or more electronic memories and executed by the one or more processors and displayed on the display device, that provides drawing tools that, when manipulated by user input, draws a portrait on a semi-transparent electronic canvas overlaid over an image obtained from a social-networking service;
   wherein the drawing user interface includes drawing tools invoked through user-input features and a user-input feature that, when invoked by user input, initiates storing operations that store a drawing displayed on the semi-transparent electronic canvas;
   a user-interface feature that, when invoked by user input, posts a drawing rendered on the semi-transparent electronic canvas to one or more user web pages provided by the social-networking service; and
   a data-storage function provided by the application that stores digitally encoded drawings and drawing log files within data storage of a cloud-computing facility.

9. The specialized portrait-drawing computer system of claim 8 wherein the drawing user interface additionally provides tools that import color and or portions of the image into the overlying semi-transparent electronic canvas.

10. The specialized portrait-drawing computer system of claim 8 wherein the specialized portrait-drawing computer system provides an interface that allows a user to retrieve a log file stored in the cloud-computing facility and replay drawing operations stored in the log file.

11. The specialized portrait-drawing computer system of claim 8 wherein the application is accessible to users of the social-networking service.

12. A method for producing and sharing digitally-encoded content within a social network, the method comprising:
   an interactive application that executes within a web-browser context to control operation of a computer system, the interactive application accessing social-networking services to access data stored on one or more physical data-storage devices accessing user-interface tools and routines through a runtime interface provided by a web-browser plug-in, and accessing a cloud-computing data-storage interface to store and retrieve digitally-encoded content to and from one or more physical data-storage devices within a cloud-computing facility;

wherein the interactive application displays, when executed in the web-browser context on a user computer system, a drawing user interface on a display device of the user computer system through which a human user draws portraits; and incorporating the interactive application into the social-networking services for access by users.

13. The method of claim 12 further including an interactive application in a development environment enhanced to include development tools and interfaces.

14. The method of claim 12 wherein the drawing user interface includes:
a semi-transparent electronic canvas;
drawing tools invoked through user-input features; and
a user-input feature that, when invoked by user input, initiates storing operations that electronically store a drawing displayed on the semi-transparent electronic canvas.

15. The method of claim 14 wherein the semi-transparent electronic canvas is overlaid by the interactive application over an image, that provides a drawing guide.

16. The method of claim 14 wherein the drawing user interface provides tools that import color and or portions of the image into the overlying semi-transparent electronic canvas.

17. The method of claim 12 wherein the interactive application provides an interface that allows a user to retrieve a log file stored in the cloud-computing facility and replay drawing operations stored in the log file.

* * * * *